United States Patent [19]

Herzog

[11] Patent Number: 4,961,267

[45] Date of Patent: Oct. 9, 1990

[54] METHOD AND APPARATUS FOR MAKING COORDINATE MEASUREMENTS

[75] Inventor: Klaus Herzog, Oberkochen, Fed. Rep. of Germany

[73] Assignee: Carl-Zeiss-Stiftung, Heidenheim/Brenz, Fed. Rep. of Germany

[21] Appl. No.: 276,471

[22] Filed: Nov. 23, 1988

Related U.S. Application Data

[63] Continuation-in-part of Ser. No. 450, May 20, 1988.

[30] Foreign Application Priority Data

May 23, 1987 [DE] Fed. Rep. of Germany ....... 3717459

[51] Int. Cl.⁵ .............................................. G01B 5/20
[52] U.S. Cl. ....................................... 33/503; 33/1 M; 33/1 MP; 33/1 PT
[58] Field of Search .................. 33/1 M, 1 MP, 1 PT, 33/503, 504, 505

[56] References Cited

U.S. PATENT DOCUMENTS

| | | |
|---|---|---|
| 3,944,798 | 3/1976 | Eaton ................................ 33/504 X |
| 4,177,568 | 12/1979 | Werner et al. . |
| 4,240,205 | 12/1980 | Tuss . |
| 4,270,277 | 6/1981 | Koenuma .......................... 33/1 M X |
| 4,833,630 | 5/1989 | Braman et al. ................... 33/504 X |

FOREIGN PATENT DOCUMENTS

| | | |
|---|---|---|
| 0027060 | 4/1981 | European Pat. Off. . |
| 0100716 | 2/1984 | European Pat. Off. . |
| 0157176 | 10/1985 | European Pat. Off. . |
| 0216041 | 1/1987 | European Pat. Off. . |
| 61-11607 | 1/1986 | Japan . |
| 18297 | of 1913 | United Kingdom . |
| 1498009 | 1/1978 | United Kingdom . |
| 2173311 | 10/1986 | United Kingdom . |

Primary Examiner—Harry N. Haroian
Attorney, Agent, or Firm—Walter Ottesen

[57] ABSTRACT

The invention is directed to a coordinate measuring apparatus which includes an elevation measuring device. The elevation measuring device is connected with a stationary granite table via one or several linkage arms for determining the planar coordinates. Transducers for detecting angular values or pull-out lengths are arranged with respect to the joints or pull-out members of the linkage arms from which these planar coordinates can be computed by a computer. A method of determining the coordinates is also disclosed.

28 Claims, 10 Drawing Sheets

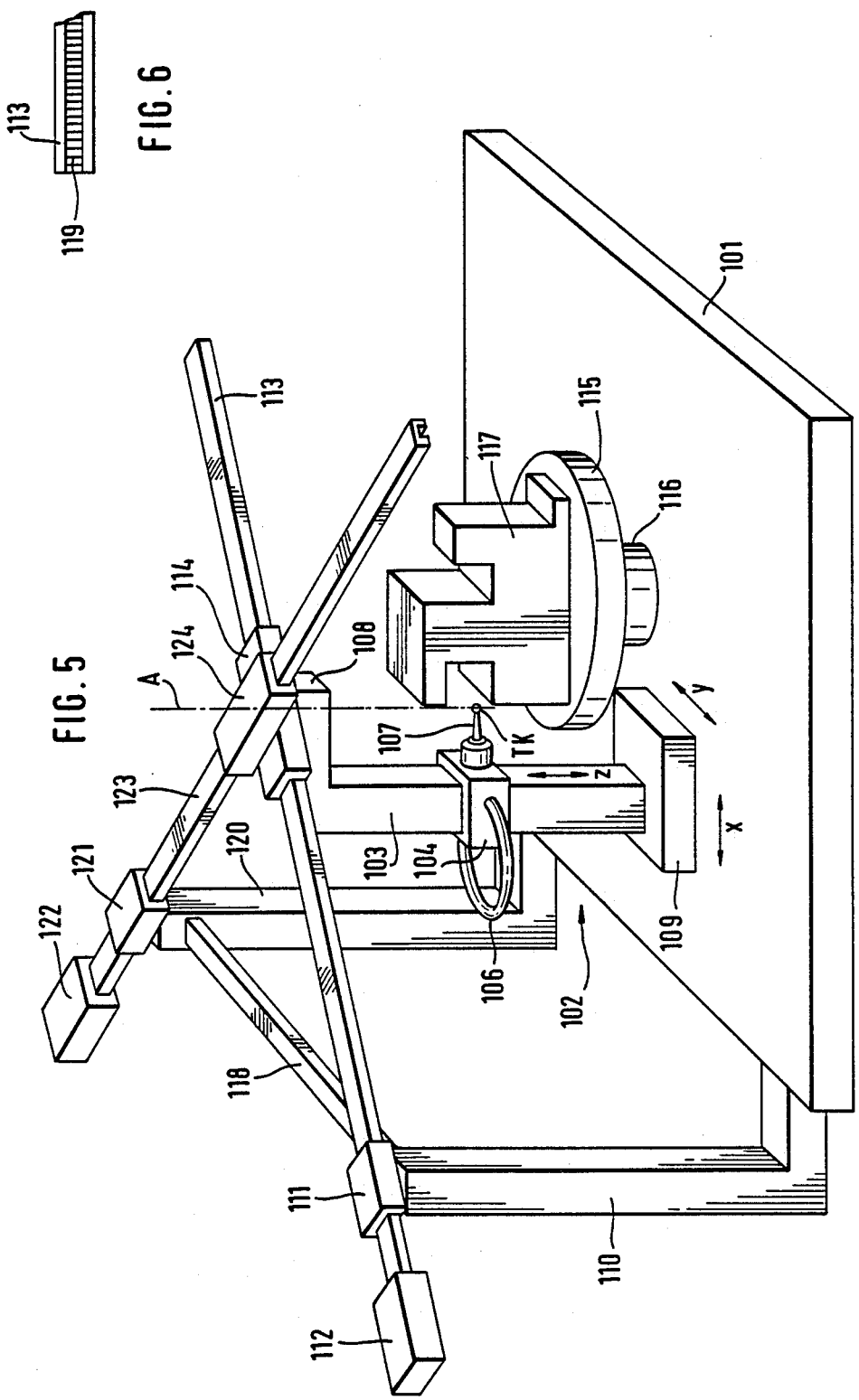

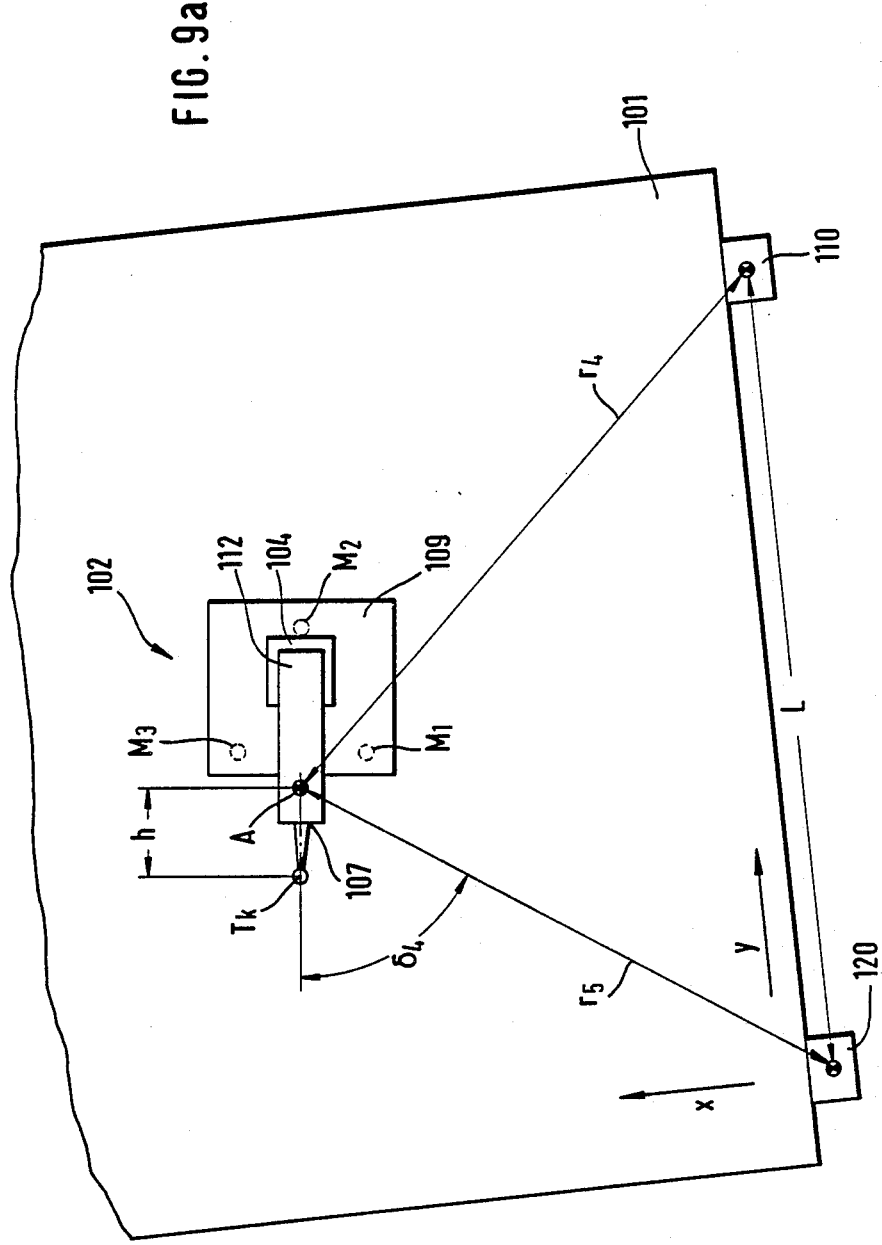

METHOD AND APPARATUS FOR MAKING COORDINATE MEASUREMENTS

RELATED APPLICATIONS

This is a continuation-in-part application of my International patent application No. PCT/EP/88/00450 filed in the European Patent Office on May 20, 1988 with priority claimed from german patent application No. P 37 17 459.2 filed in the Federal Republic of Germany on May 23, 1987.

FIELD OF THE INVENTION

The invention relates to a method for determining the coordinate values of a measuring element and a coordinate measuring apparatus for carrying out the method of the invention.

BACKGROUND OF THE INVENTION

Multi-coordinate measuring apparatus are available in the most different configurations. An overview of the different constructions is provided in an article by M. Dietsch and H. Lang in the publication entitled "Feinwerktechnik and Messtechnik 86", 1978, pages 262 to 269. All of the apparatus described therein are in principle based on the same configuration. The apparatus comprise three guides arranged so as to be mutually perpendicular and assembled one atop the other. The measuring probe is displaceable along these guides and the apparatus further include three linear scales corresponding to respective ones of the guides.

The first guide must carry the weights of each of the further guides which are built thereupon. For this reason, a stable configuration of the guides which prevents deformation during the measuring operation is required in order to obtain an adequately high measuring precision. Coordinate measuring apparatus are therefore expensive and complex measuring instruments.

Coordinate measuring apparatus are also known which do not measure in a cartesian coordinate system and instead measure in spherical or cylindrical coordinates. For example, British Patent No. 1,498,009 describes a coordinate measuring apparatus wherein the measuring head is movably held by means of three joints arranged one behind the other. The position of the measuring head in this apparatus is determined by angle encoders arranged in the joints.

A similarly configured coordinate measuring apparatus is disclosed in U.S. Pat. No. 4,240,205. In this apparatus, the measuring head is attached to a vertically displaceable probe shaft which, in turn, is guided in a plane by means of three joints having a vertically arranged rotational axis. The position of the sleeve in the plane is measured with the aid of a measuring scale and a rotational transducer. Also in both of the last-mentioned apparatus, the movable parts of the apparatus are braced on each other utilizing rotational axes for guiding the measuring head instead of linear guides. It is therefore necessary to utilize counterweights by means of which the movable machine parts must be counterbalanced and which increases the weight and mass of the movable machine parts. Furthermore, it is necessary to configure the bearings for the rotational shafts so that they are very stable since these shafts must each carry the weight of the part built up thereupon.

However, it is still not possible to carry out adequately precise measurements with these apparatus since the individual parts of the linkage arm are subjected to changing load relationships during the measurements and therefore deform in an uncontrolled manner.

So-called elevation measuring apparatus are also known. These apparatus comprise a carrier which is manually freely displaceable in a plane and on which a linear measuring probe is displaceably guided in the vertical direction. With the scale corresponding to the guide, only the elevation of the measuring probe above the plane at different locations can be measured and brought into relationship. The position of the elevation measuring apparatus in this plane is not detected. In addition, the measuring head of the elevation measuring apparatus is pivotable outwardly only along the vertical if at all.

These known measuring apparatus are therefore not multi-coordinate measuring apparatus since they are suitable for measuring in only a single dimension. An elevation measuring apparatus is known which is guided in two coordinates via a frame and whose position coordinates in the plane are determined by means of the scales corresponding to the arm guides. However, this apparatus corresponds again to the initially mentioned configuration of known multi-measuring coordinate apparatus and has disadvantages which include the condition that orthogonal errors of the guides are incorporated directly into the measuring result. Furthermore, this known apparatus can not rotate so that a rotatable table for the workpiece to be measured is additionally required.

German published patent application Nos. DE-OS 3,205,362 and DE-OS 3,629,689 disclose coordinate measuring apparatus which are based on a measuring element guided by hand or by a robot over the workpiece to be measured. The workpiece is measured from different directions with the aid of laser distance measuring devices. However, these apparatus incorporate the disadvantage that the angular alignment of the measuring element can only be determined with great effort and even then not in every position in the measuring space. Furthermore, one can not pass around the workpiece to be measured with the measuring element since at least several of the measuring rays would be interrupted.

SUMMARY OF THE INVENTION

It is an object of the invention to provide a method for determining the coordinate values of a measuring element by means of which a plurality of different measuring assignments can be carried out with adequate precision in all spatial directions with the least possible complexity.

The method of the invention is for determining the coordinate values of a measuring probe with a coordinate measuring apparatus which includes: a support defining a horizontal planar surface; a measuring device mounted on the planar surface so as to be displaceable thereon and including: a carrier having a base in contact engagement with the planar surface, the carrier defining a guide path extending vertically upwardly from the base, a measuring head mounted on the carrier so as to be vertically displaceable along the guide path, the measuring head including a measuring probe with a contact element $T_k$ responsive to contact in a plurality of directions, and position sensing means for measuring the position in elevation of the measuring head along the guide path; and, linkage means for connecting the measuring device to two fixed reference points on the horizontal planar surface; the method comprising the steps of: determining the planar position coordinates (X, Y) of the measuring device for the measuring probe by making two length measurements from the two points on the planar surface, the points having a fixed spacing (b, L) from each other; determining the angular position $\delta_4$ of the measuring device about a vertical axis (A) with the aid of an angle encoder; computing corrective values ($X_1$, $Y_1$) for the planar position coordinates (X, Y) from a known distance (h) between the axis (A) and the contact element $T_k$ as well as the measured angular position $\delta_4$; combining the measured planar position coordinates (X, Y) with the corrective values ($X_1$, $Y_1$); and, determining the elevation coordinate value (Z) of the contact element $T_k$ by means of the positioning sensing means.

Pursuant to an alternate embodiment of the method, the linkage means connects the measuring device to a fixed reference point on the horizontal planar surface defined by the support. The above method steps apply except that the planar position coordinates (X, Y) of the measuring probe are determined by one distance measurement from this fixed reference point and at least one angular measurement from this same reference point.

It is a further object of the invention to provide a coordinate measuring apparatus which is suitable for carrying out the method of the invention.

The coordinate measuring apparatus according to the invention has several advantages. First, the carrier of the measuring head is supported on a planar guide plate and can be freely displaced manually or motorically over the surface of this plate. It is therefore possible to determine the position of the carrier in the plane with the aid of a linkage arm and measuring systems corresponding to this linkage arm which is not required to carry any kind of weight.

The linkage arm is simply pivotally connected at one end to the guide plate and at the other end thereof to the carrier. The linkage arm can support itself on the guide plate by means of additional air bearings, for example. Therefore, no large-dimensioned rotary shafts or counterweights are required so that the entire arrangement has only a low mass and can easily be moved. Since the linkage arm itself is not required to carry any load, no bending occurs in the arm which is advantageous as to the measuring precision of the apparatus. Furthermore, orthogonal errors during the determination of the planar coordinates are avoided since no guides are used which are built one upon the other. The apparatus is furthermore rotatable in the plane so that a plurality of measuring assignments can be performed without a rotational table for the workpiece. The configuration provided by the invention makes it possible to provide coordinate measuring apparatus in a compact and simple construction while at the same time providing a good accessibility to the measuring space.

The linkage arms with which the carrier is attached to the guide plate can be configured in different ways. For example, it is possible to provide a linkage arm made up of three rotary shafts or a linkage arm made up of two rotary shafts and a pull-out member of variable length or to even provide two linkage arms. The position of the carrier in the plane can be determined very simply by means of the angle encoders corresponding to the rotational shafts and the linear transducers corresponding to the pull-out members of variable length. The computation of the precise coordinate values from the signals of the data sensors is performed by means of an electronic computer connected to the sensors.

It can be especially advantageous when at least one linkage arm is pivotally connected to the upper end of the carrier of the measuring device where it can not collide with the workpieces assembled on the planar guide plate. The elevation measuring device can then be freely guided through 360° about the workpiece so that a separate rotational table for the workpiece is unnecessary.

It is especially advantageous if the spacing is as small as possible between the vertical rotational shaft on which the linkage arms are pivotally connected and the measuring ball. The smaller that this spacing is the less precise does the angular measuring system used to measure this rotational angle have to be. Stated otherwise, no especially high resolution is then required for the angle encoder.

In order to maintain this condition geometrically, the carrier preferably has a C-shaped configuration in which a narrow column is built on a base plate having a large-area cross section. At the upper end, the column has an arm projecting in the direction of the measuring rod. The rotational joint is mounted on this arm and the linkage arms are connected to the elevation measuring apparatus by means of this joint.

Furthermore, the workpiece table is preferably provided with a centrally arranged narrow foot such that the carrier with its base plate can be moved beneath the table surface and therefore close to the workpiece. This configuration of the workpiece table affords further advantages. Specifically, the narrow foot of the table can be a reference point for the linkage arm. When the linkage arm is pivotally connected on the workpiece so as to be rotatable about the foot, then the carrier can likewise be moved 360° freely about the workpiece.

In order to arrive at the highest possible measuring precision, the assurance must be provided that no measuring errors will occur because of a tilting of the carrier about the vertical axis. This can be compensated for in that either a measuring system is arranged in the base plate of the carrier which measures the distance to the guide plate or electronic scales are mounted on the carrier which measure the inclination directly.

When working with sensors which measure the distance to the surface of the planar guide plate, then the precision of this surface gets included in the measuring result. More specifically, this precision can be characterized as the deviation of the topography of the guide plate from an ideal plane. In order to eliminate this influence, it is preferable to initially determine the topography of the planar guide plate in a separate correction step and to store the same as a two-dimensional correction matrix.

The coordinate measuring apparatus which operates on the basis of the method of the invention can be driven manually as well as be provided with a drive which displaces the carrier in the plane. Such a drive should preferably engage the carrier at its center of gravity. This makes possible a high speed of movement and acceleration. However, since such a drive can possibly hinder the free rotationability of the carrier through 360°, the workpiece is then arranged on a rotational table so that the free accessibility from all directions is assured, or measurements are made with two like assembled apparatus on both sides of the fixedly mounted workpiece.

BRIEF DESCRIPTION OF THE DRAWINGS

The invention will now be described with reference to the drawings wherein:

FIG. 1b is a schematic representation of the computer which operates with the coordinate measuring apparatus shown in FIG. 1a;

FIG. 2b is a schematic representation of the computer which operates with the coordinate measuring apparatus shown in FIG. 2a;

FIG. 3b is a schematic representation of the computer which operates with the coordinate measuring apparatus shown in FIG. 3a;

FIG. 4a is a perspective schematic of a fourth embodiment of the coordinate measuring apparatus of the invention;

FIG. 4b is a schematic representation of the computer which operates with the coordinate measuring apparatus shown in FIG. 4a;

FIG. 5 is a perspective schematic of a fifth preferred embodiment of the invention;

FIG. 6 shows the lower side of a portion of one of the guide arms of the embodiment of FIG. 5;

FIG. 8b is a plan view of the interferometric linkage arm of FIG. 8a;

FIG. 9a is a simplified schematic plan view of the apparatus shown in FIGS. 5 to 8;

DESCRIPTION OF THE PREFERRED EMBODIMENTS OF THE INVENTION

Figure 1A:
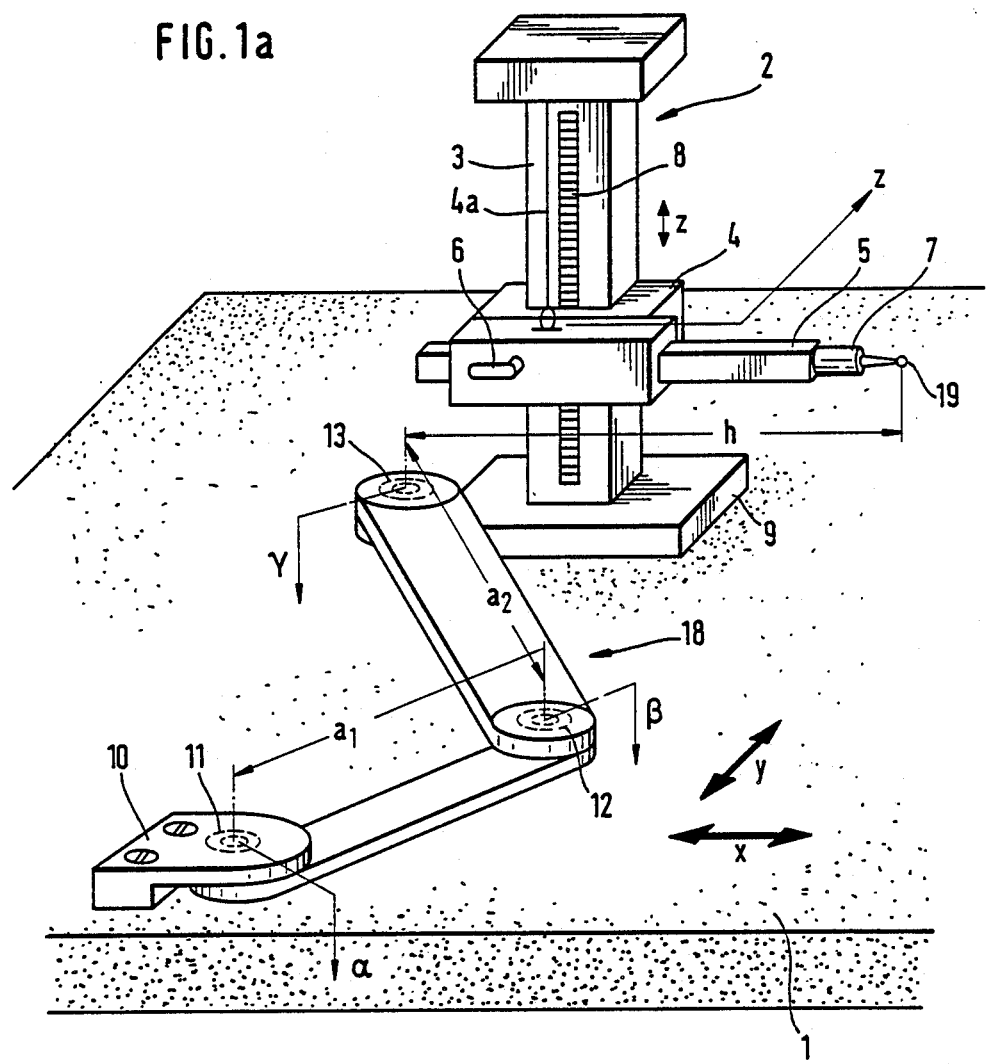
FIG. 1a is a perspective schematic of the mechanical parts of a first embodiment of the coordinate measuring apparatus according to the invention.
Figure 1B:
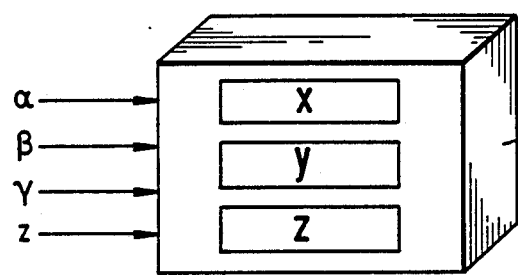

The coordinate measuring apparatus shown in FIG. 1a is an extension of an elevation measuring apparatus 2 of known configuration which is displaceable on an even granite plate 1. Such an elevation measuring apparatus includes a vertical column 3 along which a slider 4 is displaceable in elevation, that is in the Z-direction. The column 3 carries a scale 8 for measuring the Z-position. This scale 8 is scanned by a photoelectric transducer system (not shown) arranged in the slider 4. An arm 5 is journalled in the slider so as to be horizontally displaceable. The arm 5 carries a measuring head 7 at its end and can be clamped tight via the lever 6 with the aid of a clamping arrangement disposed in the slider 4.

The weight of the slider 4, measuring arm 5 and measuring head 7 is balanced by a counterweight guided in the column 3 for which the line 4a is shown.

The elevation measuring apparatus 2 is braced via air bearings on the granite plate 1 so that the elevation measuring device 2 can be displaced free of friction. The air bearings are integrated into the base 9 of the column 3.

The measuring head 7 is not a one-dimensional linear measuring probe and is instead a 3D-measuring head responsive in all three directions. A 3D-measuring head of this kind is described in U.S. Pat. No. 4,177,568 incorporated herein by reference.

Figure 2A:
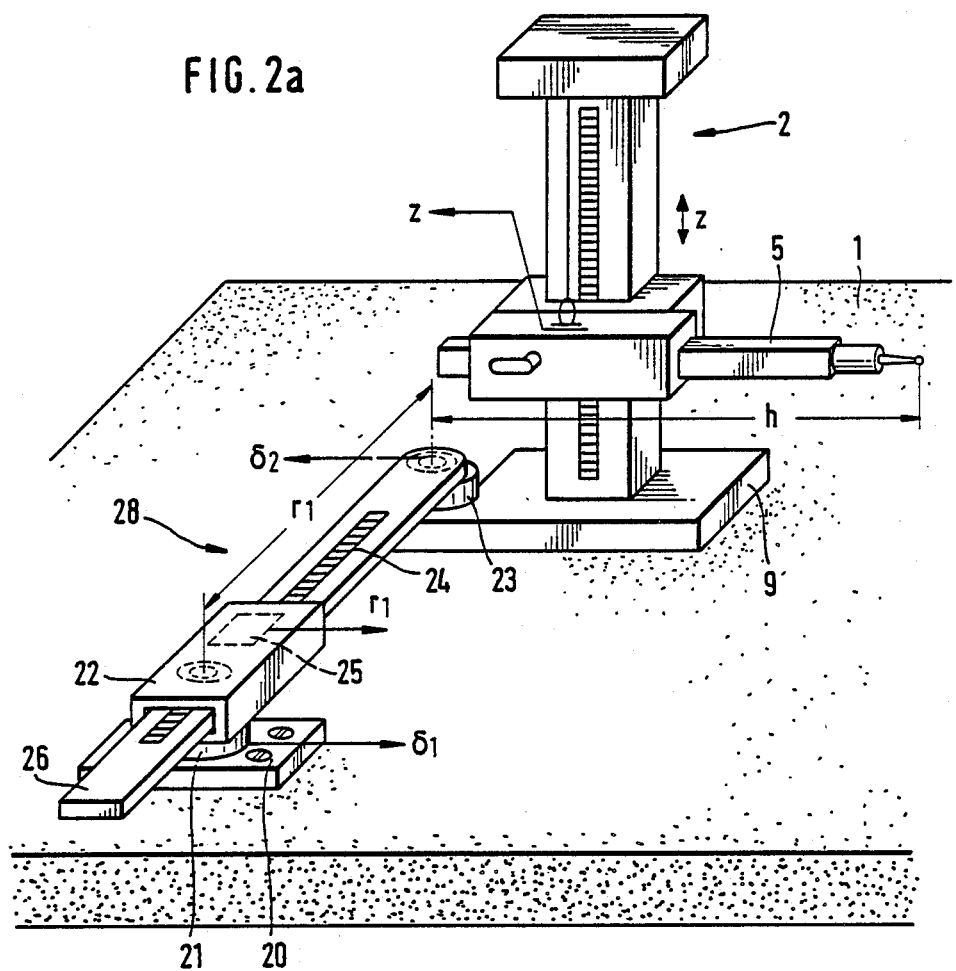
FIG. 2a is a perspective schematic of a second embodiment of the coordinate measuring apparatus which is modified with respect to the linkage arm.
Figure 3A:
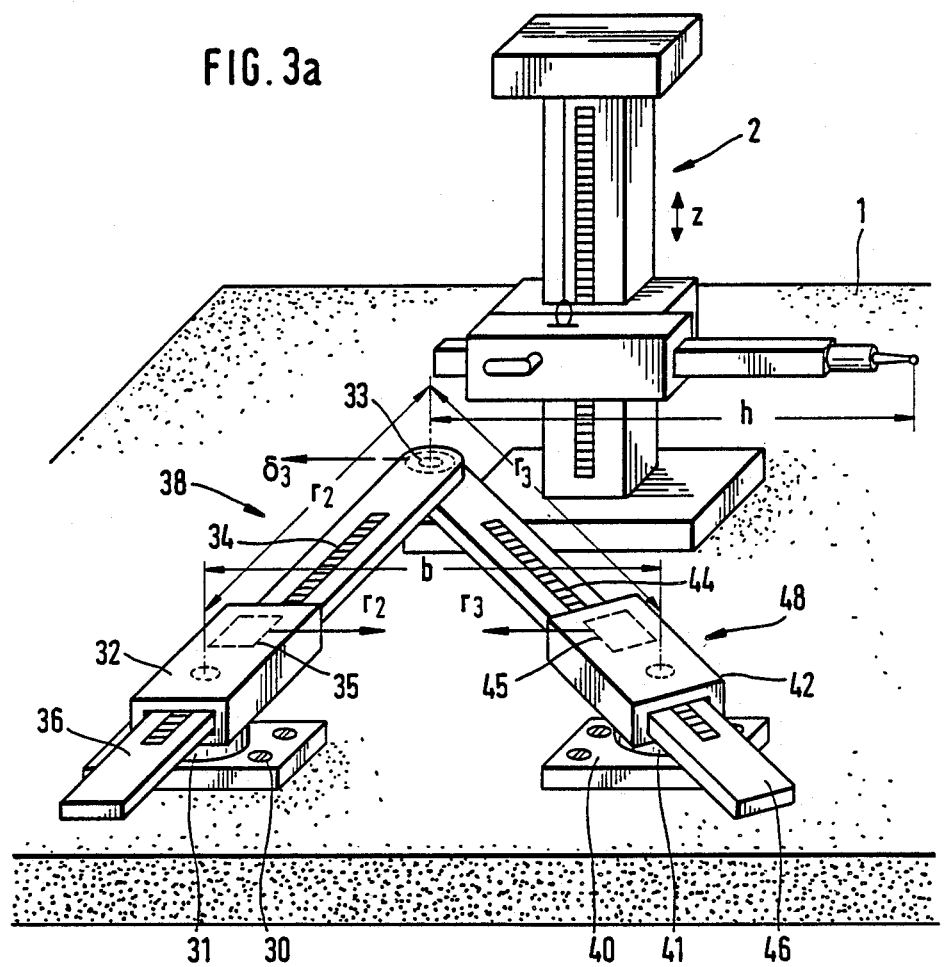
FIG. 3a is a perspective schematic of a third embodiment of the coordinate measuring apparatus of the invention having two linkage arms.
Figures 4A, 4B:
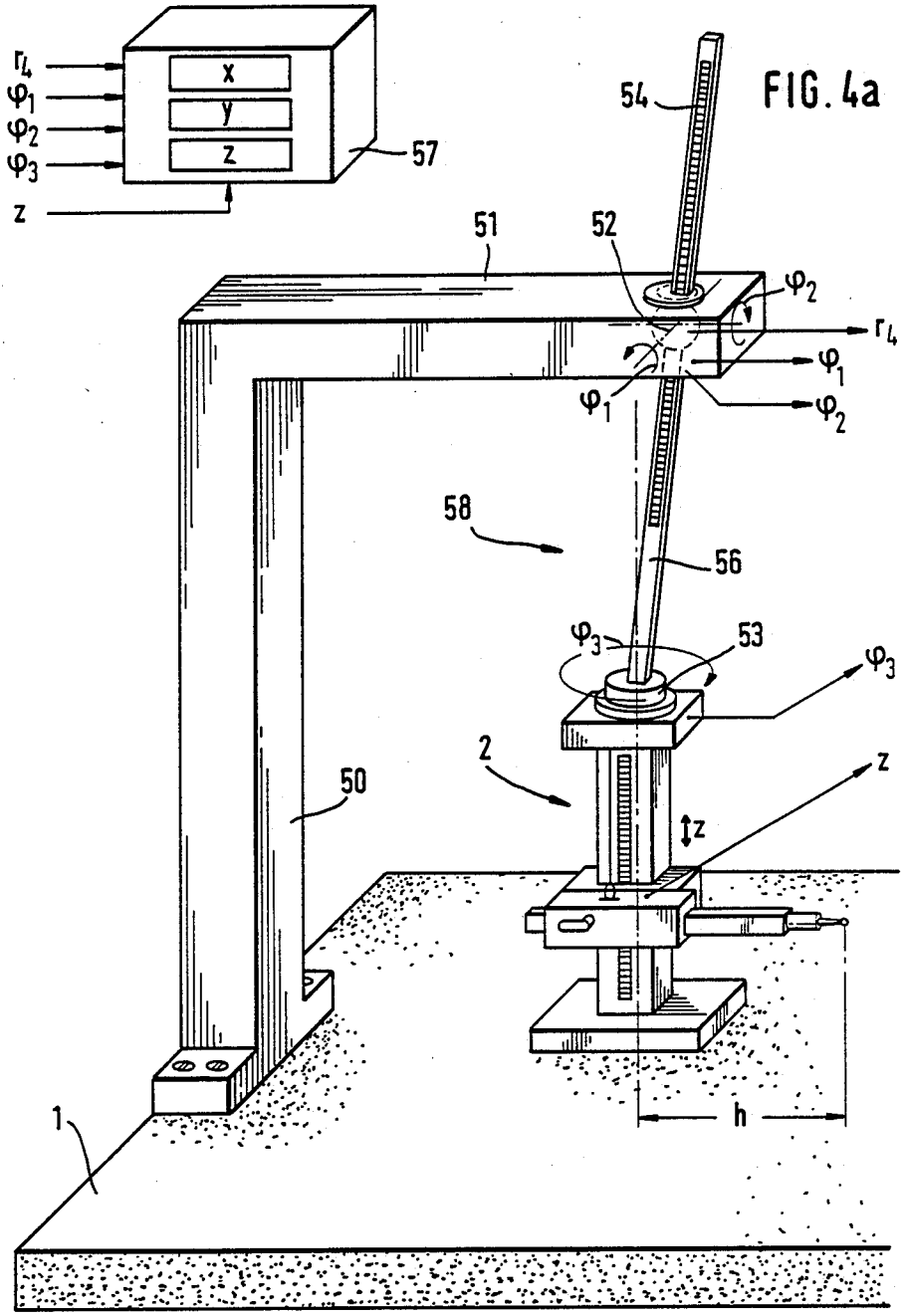

The elevation measuring device described with respect to FIG. 1a is also a component of the embodiments shown in FIGS. 2a, 3a and 4a and has the same configuration therein.

As mentioned initially, elevation measuring devices only detect the elevation (Z) of the measuring points scanned by the measuring head 7. The base 9 of the elevation measuring device 2 is connected with the stationary granite plate 1 via a linkage arm 18 so that also the coordinate values (X and Y) can be detected in the plane of the granite plate 1.

The linkage arm 18 comprises two parts with the first part being rotatably journalled by means of a first rotary joint 11 with respect to a holding plate 10 attached to the granite plate 1 by threaded fasteners. The second part is attached to the first part by means of a second rotary joint 12 and, in addition, the second part is attached by means of a third rotary joint 13 to the base plate 9 of the elevation measuring device 2. The linkage arm 18 thereby permits a free displacement of the elevation measuring device 2 and has no loads whatsoever to carry except for its own weight. The linkage arm 18 including the bearings for the rotary joints (11, 12, 13) can therefore be produced at a favorable cost. The weight of the linkage arm 18 itself can be taken up by means of an air bearing mounted beneath the rotary joint 12 so that changing load relationships with reference to the bearings of the rotary joint do not occur during a measuring operation, that is, the movements of the elevation measuring device apply no forces to the components of the device which are relevant in making measurements.

Three angle encoders are built into respective ones of the three rotary joints (11, 12, 13) by means of which the respective angular positions ($\alpha$, $\beta$, $\gamma$) of the rotated or pivoted parts are measured. The position of the measuring probe 19 on the measuring rod of the measuring head 7 is definitively determined from the following: the known length $a_1$ of the part between the rotary shafts of the rotary joints (11 and 12) and the length $a_2$ of the part between the rotary shafts of rotational joints (12 and 13) as well as the extended length (h) of the measuring arm 5 of the elevation measuring device.

The angle encoders in the rotational joints (11, 12, 13) and the transducer system for the scale 8 on the elevation measuring device 2 are connected to a computer 17 shown in FIG. 16 which computes and indicates the position of the center of the contact ball of the measuring probe 19 in cartesian coordinates from the following: the angles ($\alpha$, $\beta$, $\gamma$); the measured elevation value (Z); and, the initially inputted parameters ($a_1$, $a_2$) and (h).

Whereas the lengths $a_1$ and $a_2$ of the linkage arm 18 are unchangeable and are fixedly stored in the computer as parameters, the extended length (h) of the measuring arm 5 is changeable after the clamping lever 6 is released and is then adaptable to different measuring tasks. However, it is not necessary that the pull-out length (h) of the arm 5 be determined with an additional scale. The coordinate measuring apparatus comprising the elevation measuring device 2 and the linkage arm 18 can be newly calibrated after changing the pull-out length (h) and again reclamping the arm 5 by utilizing a calibration arrangement disposed in the measuring region of the measuring apparatus. For this purpose, the measuring points of the calibration arrangement are scanned several times from significantly different positions of the elevation measuring device 2. The unknown extended pull-out length (h) can be computed by setting the measured values at different positions of the measuring device 2 equal to each other.

The embodiment shown in FIG. 2a differs from that shown in FIG. 1a in the configuration of the linkage arm 28 with which the elevation measuring device is pivotally connected to the granite plate 1. The linkage arm 28 includes a pull-out member 26 of variable length which is journalled in a linear guide 22. The guide 22 is pivotally mounted on a holding part 20 via a first rotational joint 21 and the holding part 20 is attached to the granite plate by threaded fasteners. The pull-out member 26 is provided with a linear scale 24 and is connected with the base 9 of the elevation measuring device 2 via a second rotational joint 23.

A transducer system 25 for scanning the scale 24 is disposed in the guide 22 for the pull-out member 26. Here too, the rotational joints (21, 23) are provided with angle encoders for measuring the respective rotational angles $\delta_1$ and $\delta_2$ with the angle $\delta_1$ being between the pull-out member 26 and the holding part 20 and the rotational angle $\delta_2$ being between the elevation measuring device 2 and the pull-out member 26.

Figure 2B:
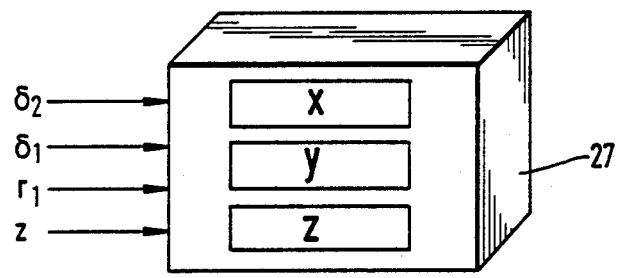

The computer 27 shown in FIG. 2b of the apparatus of FIG. 2a computes the coordinates (X, Y, Z) of the measuring probe of the measuring head on the elevation measuring device 2 from the following: the measured values $\delta_1$ and $\delta_2$ of the respective angle encoders disposed in corresponding ones of the rotational joints (21, 23); the measured pull-out length $r_1$ of the linkage arm 28; and, the length (h) of the measuring arm 5 on the elevation measuring device 2 which is determined by means of the calibration operation.

In the embodiment according to FIG. 3a, a coordinate measuring apparatus is disclosed which determines the position in the plane of the granite plate 1 by means of two linkage arms (38 and 48) of the type of apparatus described with respect to FIG. 2a. For this purpose, the pull-out member 36 of the first linkage arm 38 carries a first linear scale 34 and the pull-out member 46 of the second linkage arm 48 carries a like linear scale 44. The first pull-out arm 36 is pivotally connected to the holding part 30 and the granite plate via a first rotational joint 31 and the pull-out member 46 is pivotally connected to the second holding part 40 via a second rotational joint 41. Both scales are scanned by corresponding ones of sensors (35 and 45) in the corresponding ones of linear guides (32 and 42) of linkage arms (38 and 48), respectively. These sensors (35 and 45) provide corresponding ones of measured values ($r_2$ and $r_3$) for the pull-out lengths of both linkage arms. Both linkage arms are connected at one end thereof to the granite plate with a fixed spacing (b) maintained therebetween and are pivotally connected to the base plate 9 of the elevation measuring device 2 via a double joint 33 having a common rotational axis. Only the joint 33 is provided with an angle encoder which measures the rotational angle of the elevation measuring device 2 relative to one of the two pull-out arms (36 or 46).

The position of the rotational axis of the joint 33 in the plane of the granite plate is definitively determined with the knowledge of the base distance (b) of both linkage arms and the pull-out lengths ($r_2$ and $r_3$) which form a triangle having known side lengths. Starting from this point, the position of the measuring probe can be determined with the aid of the measuring value $\delta_3$ of the angle encoder in rotational joint 33 and the pull-out length (h) of the measuring arm of the elevation measuring device 2. The necessary trigonometric computations are carried out by the computer 37 to which the outputs of the above-mentioned data sensors are connected.

In this embodiment, the linkage arms do need more space and limit the region of movement and the usable measuring region of the apparatus; however, they afford the advantage that a greater precision can be obtained.

In the embodiment of FIG. 4a, the linkage arm 58 used for measuring the planar coordinates (X, Y) is pivotally connected at the upper end of the column of the elevation measuring device 2. The linkage arm 58 includes a rod 56 which is connected at one end to the elevation measuring device 2 by means of a first cardanic double joint 53 so as to be movable in all directions. The rod 56 is displaceably journalled in a sleeve likewise journalled cardanically in a second joint 52. The sleeve is attached to the part 51 of a stationary carrier 50 with the part 51 projecting out over the measuring region. The sensor system for the linear scale 54 mounted on the rod 56 is disposed in the sleeve.

Two angle encoders are assigned to the cardanic joint 52 for measuring the angles $\rho_1$, and $\rho_2$, which the rod 56 defines with respect to the granite plate 1 on which the elevation measuring device 2 rests. Furthermore, an angle encoder for measuring the angle $\rho_3$ is assigned to the joint 53 at the upper end of the elevation measuring device 2. The angle $\rho_3$ is the angle about which the elevation measuring device is rotated about the vertical axis.

The computer 57 shown in FIG. 4b of the coordinate measuring apparatus of FIG. 4a computes the cartesian coordinates (X, Y, Z) of the contact ball of the measuring probe of the apparatus from the following: the linear measurement value $r_4$ of the scale 54, the angles ($\rho_1, \rho_2, \rho_3$) of the angle encoders; and the Z-value of the scale on the elevation measuring device 2. With this, a conversion of the polar coordinates ($r_4, \rho_1, \rho_2$) into a cartesian coordinate system projected onto the plane of the granite plate takes place.

The movability of the elevation measuring device 2 in the plane is disturbed in the least amount when compared to the other illustrated embodiments as a consequence of the pivotal connection of the linkage arm 58 at the upper end of the device 2.

A further embodiment of the invention wherein the linkage arms are likewise pivotally connected at the upper end of the elevation measuring device is shown in FIG. 5. In this embodiment, the elevation measuring device 102 has an approximately C-shaped form when viewed in vertical section with the lower leg of the C-shape being defined by a base plate 109 on which a vertical carrier 103 is built up. A slider 104 for the measuring probe 107 is displaceable in the vertical direction on this carrier 103. The slider 104 is provided with a bale-type handle 106 by means of which the apparatus 102 can be displaced on the planar granite plate 101 and the measuring probe 107 can be displaced in elevation.

The upper portion 108 of carrier 103 extends in the direction of the end of the measuring probe and defines the upper leg of the C-shape. The guide arms (113, 123) having scales for measuring the position of the elevation measuring device in the plane (X, Y) are rotatably connected to this forwardly extending part 108. The rotational axis is identified in FIG. 5 by the reference character (A). The position of the rotational axis is so selected that it passes through the center point of the contact ball $T_k$ of the measuring probe 107 or is at only a very slight distance therefrom.

Figure 3B:
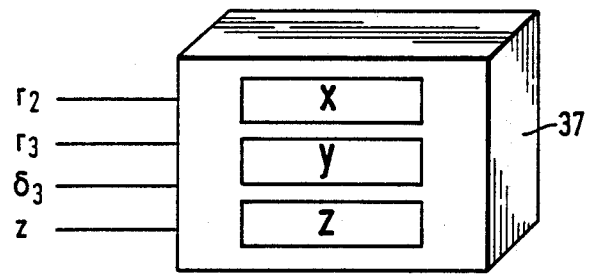

Two columns (110, 120) are fixedly mounted on the rearward end of the granite plate 101. The columns (110, 120) both support a rotatable bearing at their upper ends by means of which the guide arms (113 and 123) are rotatably held in the manner according to the embodiment of FIG. 3. The guide arms (113 and 123) are attached to the top of the columns with the aid of holders (111 and 121), respectively. The guide arms (113 and 123) each carry scale divisions 119 at their lower side as indicated in FIG. 6. The guide arms (113, 123) are guided in respective guide housings (114, 124) so as to be linearly displaceable. The guide housings (114, 124) are rotatably journalled on the upper end of the elevation measuring device so as to be rotatable about the axis (A). The guide arms (113 and 123) extend outwardly over the forward end of the elevation measuring device 102. It is also possible to mount the guide arms so that they project outwardly toward the rear beyond the columns (110 and 120), respectively.

For lower requirements on measuring accuracy, a projection of the guide arms can be avoided if in lieu of the rigid guide arms, measuring bands are utilized which are guided into the interior of the columns (110, 120) via a directional changing roller and are held under tension within the columns by means of a spring disposed therein.

The guide arms (113, 123) carry respective counterweights (112, 122) at their rearward ends. With the aid of these counterweights, the guide arms (113, 123) are so balanced that they lie without force on the upper side of the carrier 103. In this way, changing load relationships are prevented which would otherwise occur when the spacing between the elevation measuring device 102 and the columns (110, 120) changes.

Figure 7:
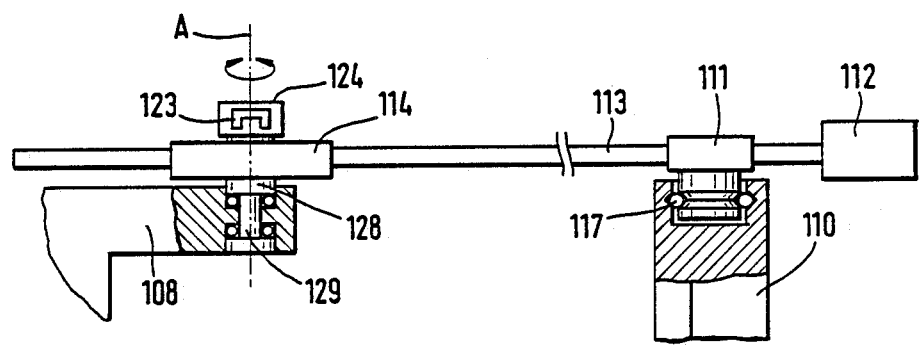
FIG. 7 is a side elevation view of one of the guide arms of the apparatus of FIG. 5.

The manner in which the column 110 and the elevation measuring device 102 are connected by means of the guide arm 113 is shown in greater detail in FIG. 7. The rotational bearing 117 at the upper end of the column 110 as well as the rotational bearing 129 at the upper end 108 of the elevation measuring device are both shown in the partial section views of FIG. 7. An angle encoder 128 is assigned to the last-mentioned bearing 129 and measures the rotational position of the elevation measuring device 102 relative to the direction of the guide arm 113. The housings (114 and 124) in which the respective guide arms (113 and 123) are longitudinally guided, also contain a photoelectric incremental transducer system by means of which the scale divisions 119 of the linear scales contained in the guide arms (113 and 123) are scanned.

As shown in FIG. 5, the two columns (110 and 120) are connected at their upper ends by a rod 118 having a low thermal coefficient of expansion with the material of the rod being invar steel, for example. This measure is especially significant since the spacing of both columns or, more specifically, the locations of rotation carried thereby defines the basis for the measurement of the planar coordinates of the elevation measuring device 102 as will be explained below with respect to FIGS. 9a, 9b and 9c. If it is further assured that the linear scales are likewise made of a material having a low thermal coefficient of expansion, the position of the rotational axis (A) or, more specifically, of the elevation measuring device in the plane (X, Y) can be determined with very great accuracy. On the other hand, if it is assured that the thermal expansion of the rod and scale is detected by means of a temperature measurement, the position of the rotational axis (A) can likewise be obtained with very high precision.

The workpiece to be measured is identified in FIG. 5 with reference numeral 117. The workpiece rests on a workpiece table having a plate 115 attached to granite plate 101 via a narrow foot 116 arranged in the center of the plate 115. With this measure and in combination with the free rotatability of the elevation measuring device beneath the linkage arms (113 and 123), it is possible to move completely around the workpiece 117 with the elevation measuring device 102 in order to measure the workpiece on all sides thereof.

The above-mentioned free rotatability of 360° about the workpiece can also be achieved with the embodiments illustrated in FIGS. (1a, 1b) and (2a, 2b). This is achieved in that a workpiece table having a single centrally mounted base is set up in the measuring region and the fixed reference points (10, 20) for the respective individual linkage arms are mounted under the table instead of at the edge of the measuring region. In this way, the linkage arm is rotatable about the base of the table. A pivotal connection at the upper end of the elevation measuring device then becomes unnecessary.

A great many measuring problems can be solved with a coordinate measuring apparatus having the configuration of the coordinate measuring apparatus of FIG. 5. Up till now these measuring problems such as inclined bores in prismatic workpieces or rotational parts for example, required a complex round table or an inconvenient measuring probe configuration or a rotational-translational link.

Figure 8A:
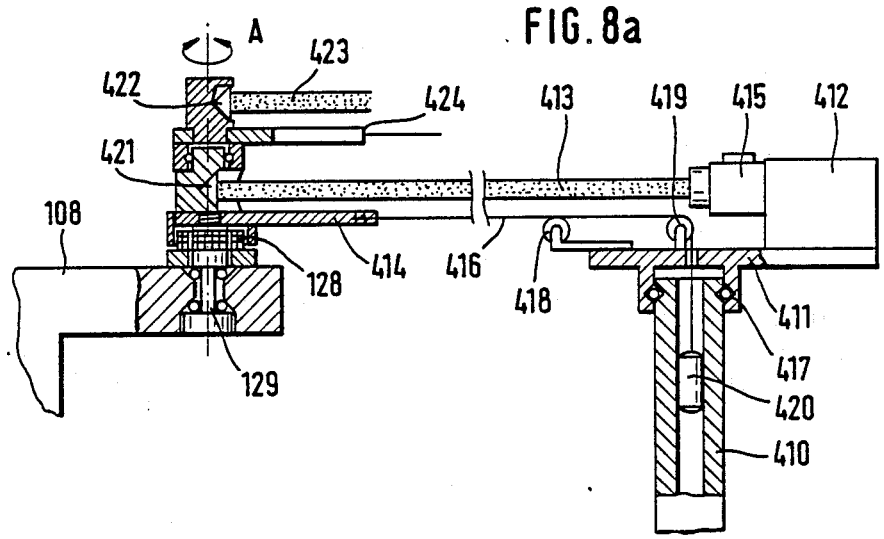
FIG. 8a is a detailed side elevation view of an interferometric linkage arm which can be alternately used with the apparatus of FIG. 5.
Figure 8B:
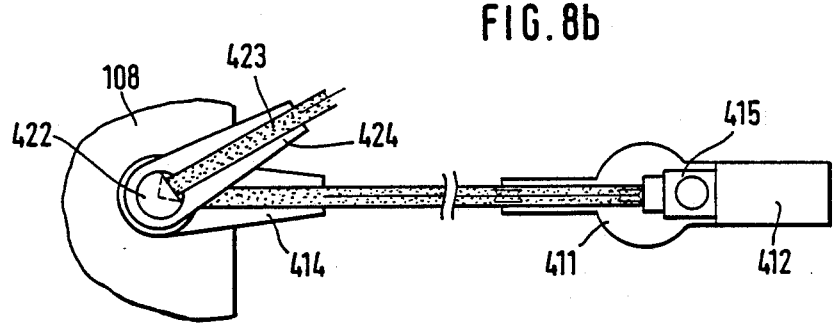

The guide arms 113 and 123 having linear scales in the embodiments according to FIGS. 5 to 7 can furthermore be replaced with interferometric linear measuring systems. This is then especially advantageous if large measuring lengths are desired with the guide arms then becoming too long to be manipulated. An embodiment modified for measuring long lengths is shown in FIGS. 8a and 8b. A rotatably journalled plate 411 is mounted on each of the two columns at the rearward end of the base plate 101 and a laser generator 412 having an interferometer head 415 mounted thereon is, in turn, mounted on each one of the plates 411. In FIGS. 8a and 8b, the corresponding column is identified by reference numeral 410. A carrier plate 414 is mounted on the rotational bearing 129 on the upper part 108 of the elevation measuring device and a reflector prism 421 measured by the interferometer 415 is mounted on the carrier plate 414. A second reflector prism 422 is, in turn, rotatably journalled on the carrier of the prism 421 and is measured from a second interferometer (not shown) on the other column. The carrier plate 414 is caused to always follow with the aid of a tension wire 416 so that the measuring beam 413 of the interferometer impinges perpendicularly onto the reflector prism 421. For this purpose, the tension wire 416 is guided over the two rollers 418 and 419 on the rotatable plate 411. The tension of the wire is produced by a counterweight 420 which is guided in the hollow column 410. A corresponding arrangement for follow-up is provided for the second prism 422.

The position of the rotational axis (A) in the horizontal plane (X, Y) can be definitively determined on the basis of simple trigonometric relationships with the aid of both interferometric measuring beams 413 and 423. This is shown in FIG. 9a wherein the spacing between the two rotational axes in the columns 110 and 120 is designated by reference character (L) and the distances measured by the interferometer systems from these rotational axes to the rotational axis (A) on the elevation measuring device 102 are designated by reference characters $r_4$ and $r_5$, respectively.

However, for carrying out coordinate measurements, it is necessary that the precise location of the contact ball $T_k$ in the plane be known. For this purpose, the rotational position of the elevation measuring device 102 or of the carrier 103, must be determined. This is achieved by means of the angle encoder 128 (FIGS. 7 and 8a) which indicates the angle $\delta_4$ between the axis of the probe pin of the measuring probe 107 and one of the two arms in the case of the embodiment of FIG. 7 and one of the two measuring beams in the case of the embodiment of FIG. 8a. From this it is possible to determine the coordinates (X, Y) of the contact ball $T_k$ in the plane with a knowledge of the distance (h) between contact ball $T_k$ and the rotational axis (A). The distance (h) is shown exaggerated in FIG. 9a. It is advantageous to maintain this distance as small as possible since then only a low cost sensor having low resolution and not having a high measuring precision can be used for measuring the angle $\delta_4$. A rigid guide rod can be utilized in lieu of the tension wire or be utilized in addition thereto when the above-mentioned precondition is not provided and when the reference line against which the angle encoder 128 measures is not determined with adequate precision with the aid of tension wires 416.

Since the contact ball $T_k$ is disposed beneath the plane defined by the measuring beams $r_4$ and $r_5$, measuring errors can occur when the Z-guide for the measuring head carrier 104 is not always perpendicularly aligned to this plane. Such tilting can occur, for example, because of dynamic forces when moving the elevation measuring device or can be caused by the lack of evenness of the granite plate 101 on which the elevation measuring device 102 glides by means of air bearings. The corresponding relationships are graphically illustrated in the side elevation view of FIG. 9b. A position error of the contact ball $T_k$ in dependence upon elevation Z can occur in the plane (X, Y) and be dependent on the tilt angle designated by $\alpha_4$. In the illustrated example, the tilt angle $\alpha_4$ is shown in the vertical plane in which the axis of the probe rod is disposed for the purpose of providing a clearer illustration. However, it is clear that the tilting can occur to all sides and therefore the component of the tilt angle in the direction perpendicular to the plane of the drawing must also be considered.

Figure 9C:
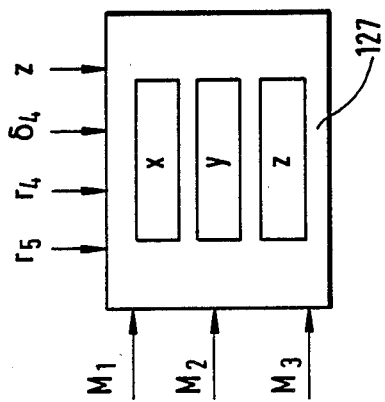
FIG. 9c is a schematic representation of the computer which operates with the coordinate measuring apparatus shown in FIGS. 9a and 9b.
Figure 9B:
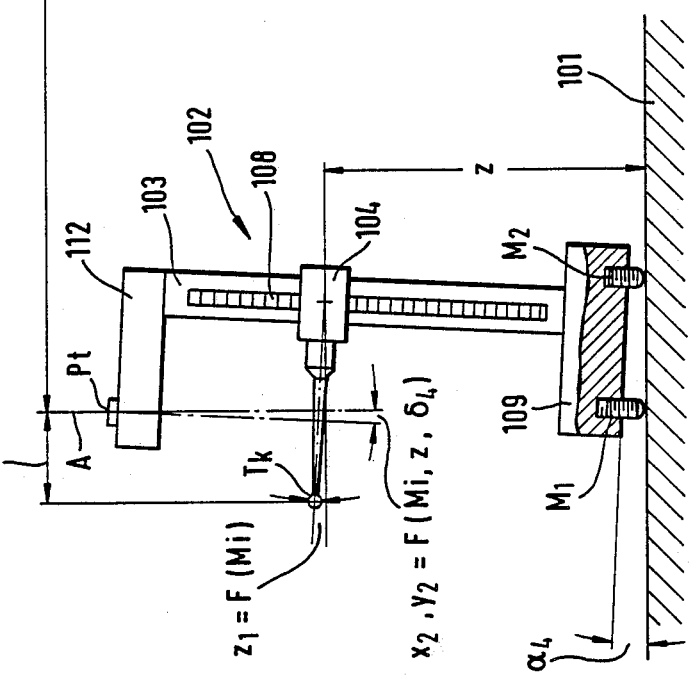
FIG. 9b is a simplified schematic side elevation view of the apparatus shown in FIGS. 5 to 8.

An embodiment suitable for carrying out high precision measurements is shown in FIGS. 9a, 9b and 9c. In this embodiment, the base plate 109 of the elevation measuring device 102 is equipped with three inductive probes ($M_1$, $M_2$, $M_3$) which are built into the latter and measure the distance to the surface of the granite plate 101. From the signals of these inductive probes, the tilt angle $\alpha_4$ and the correction coordinates ($X_2$, $Y_2$) can be computed which are caused by the tilting with respect to the position of the plane (X, Y). The tilting produces also an elevation error $Z_1$ which is dependent upon the distance between the Z-scale 108 and the contact ball $T_k$. This correction value can also be determined with the aid of the sensors ($M_1$, $M_2$, $M_3$). The required computations of the correction data are carried out in the computer 127 9c. The measured values of the inductive probes ($M_1$, $M_2$, $M_3$) are supplied to this computer 127 as are the measured values ($r_4$, $r_5$, $\delta_4$ and Z) which are provided by the interferometers, the angle encoder 128 and the transducer corresponding to the scale 108. Since the described nature of the correction of the tilt error has as a precondition that the surface of the plate 101 be even, the memory of the computer 127 also has a two-dimensional correction matrix stored therein in which all the planar deviations are contained. The detection of the planar deviations, that is, the topography of the surface of the plate 101 can, for example, be determined in a one-time calibration procedure with the aid of electronic inclination meters.

Figure 10:
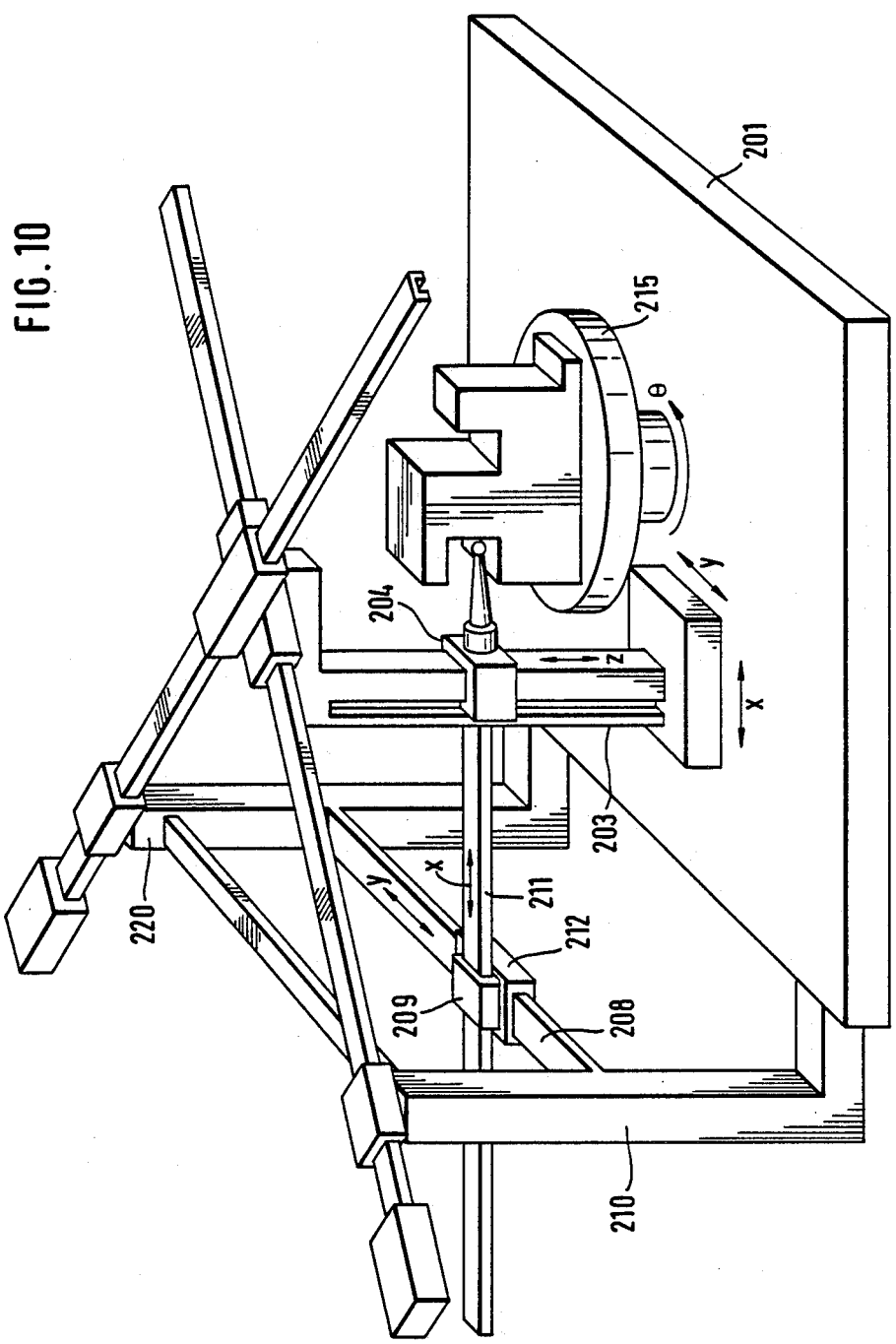
FIG. 10 is a perspective schematic of a motorized coordinate measuring apparatus according to a further embodiment of the invention; and, FIG. 11 is a perspective schematic of a further embodiment of the invention.

In the embodiments described above, only hand-operated coordinate measuring apparatus according to the invention have been described, that is, the particular elevation measuring device is moved manually across the granite plate. A motorized embodiment is shown in FIG. 10 and corresponds substantially to the hand-operated apparatus of FIG. 5. The same parts are not described again and therefore are not provided with reference characters.

A push rod 211 acts on the rearward side of the stand 203 of the motorized measuring device of FIG. 10. The push rod 211 is moved by a linear drive which is disposed in a housing 209 on a slider 212. The slider 212 in turn is displaceable along the transverse carrier 208 between the two columns 210 and 220 via a second linear drive. The two linear drives move the measuring device in the plane (X, Y).

The push rod 211 acts at approximately the elevation of the center of gravity of the elevation measuring device. It can therefore be rapidly moved without the occurrence of any disturbing tilting moments.

It is not possible to move around the workpiece from all sides because of the special drive illustrated for this embodiment. For this reason, the table 215 is configured as a rotary table or a switching table which can take on several defined angular positions with reference to the base plate 201.

Figure 11:
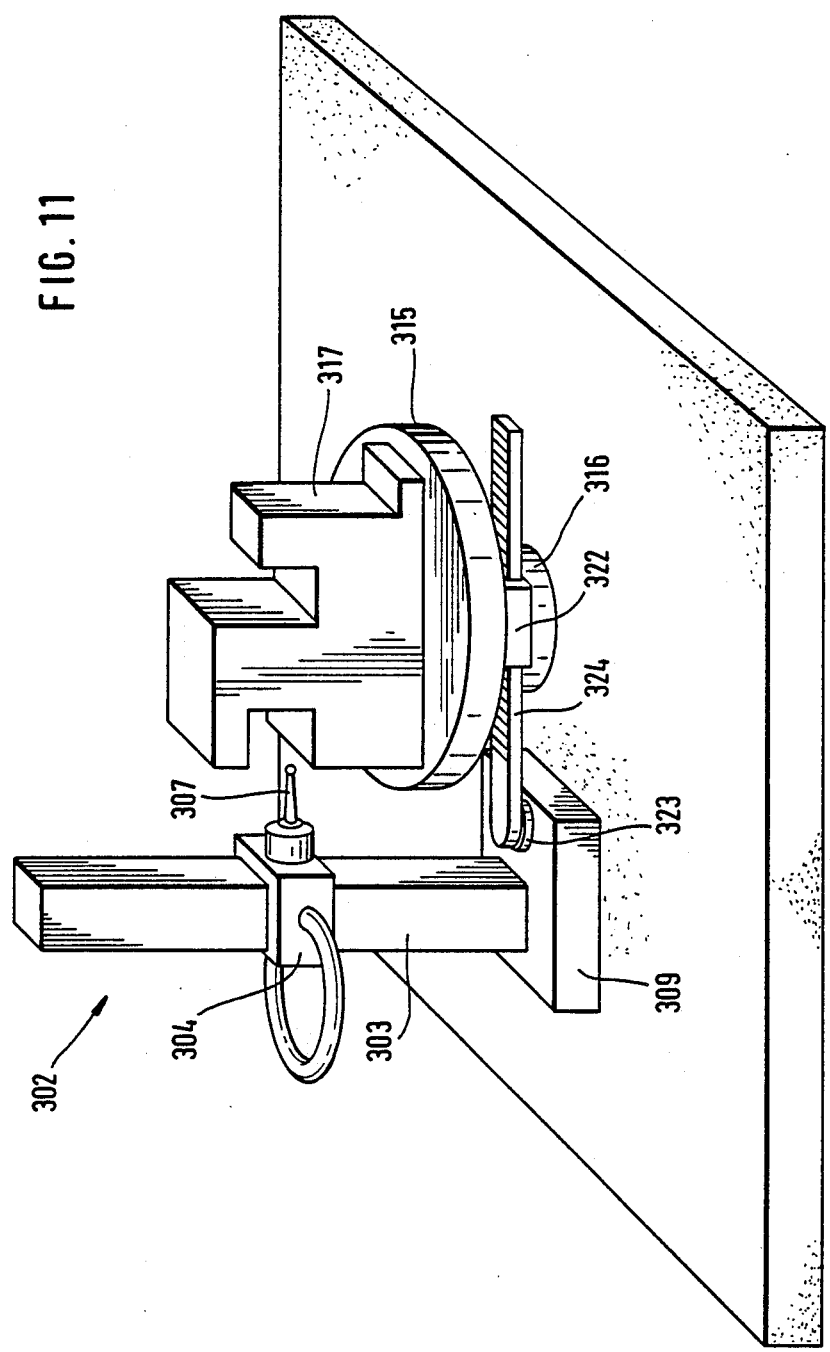

A modification of the embodiment shown in FIG. 5 is provided by the embodiment of FIG. 11 wherein the linkage arms 123 and 113 mounted on respective columns 120 and 110 are omitted. In lieu of the arms 123 and 113, a linkage arm 324 is rotatably connected to the foot 316 of the table 315. The other end of the linkage arm 324 is pivotally connected to the base plate 309 of the elevation measuring device 302 by means of a bearing 323.

The linkage arm 324 corresponds essentially to the linkage arm 28 shown in FIG. 2 with the difference that the arm 324 is rotatably mounted on the foot 316 of the table 315 rather than at the edge of the measuring region. The remaining parts of the embodiment of FIG. 11 correspond directly to those of the embodiment shown in FIG. 5.

Thus, the workpiece table 315 is preferably provided with a centrally arranged narrow foot 316 such that the carrier 303 with its base plate 309 can be moved beneath the table surface and therefore close to the workpiece. This configuration of the workpiece table 315 affords further advantages. Specifically, the narrow foot 316 of the table 315 can be a reference point for the linkage arm 324. When the linkage arm 324 is pivotally connected so as to be rotatable about the foot 316, then the carrier 303 can likewise be move 360° freely about the workpiece 317.

It is understood that the foregoing description is that of the preferred embodiments of the invention and that various changes and modifications may be made thereto without departing from the spirit and scope of the invention as defined in the appended claims.

What is claimed is:

1. A coordinate measuring apparatus comprising:
    surface means for defining a planar surface;
    a measuring device mounted on said surface so as to be movable thereon, the measuring device including: a carrier having a base in contact engagement with said surface; said carrier defining a guide path extending vertically upwardly from said base; a measuring head mounted on said carrier so as to be displaceable along said guide path; said measuring head including a measuring probe responsive to contact in a plurality of spatial directions; and, position sensing means for measuring the vertical position of said measuring head along said guide path;
    linkage means for connecting said measuring device to a fixed reference location on said planar surface;
    a plurality of sensing units mounted on said linkage means for measuring the position of said measuring device in said plane;
    said linkage means including: a guide; a first rotational joint for pivotally mounting said guide at said reference location; a pull-out arm slideably engaging said guide and having an outer end; and, a second rotational joint pivotally connecting said outer end to said measuring device;
    one of said sensing units being a linear transducer for measuring the pull-out length of said pull-out arm with respect to said guide;
    one of the remaining ones of said sensing units being a first angle encoder corresponding to said first rotational joint for measuring the angular position of said arm vis-a-vis said reference location; and,
    an other one of the remaining ones of said sensing units being a second angle encoder corresponding to said second rotational joint for measuring the angular position of said arm vis-a-vis said measuring device.

2. The coordinate measuring apparatus of claim 1, comprising: computer means connected to the outputs of said position sensing means and said sensing units to receive the signals thereof for computing the position of said measuring probe in a predetermined coordinate system.

3. A coordinate measuring apparatus comprising:
    surface means for defining a planar surface;
    a measuring device mounted on said surface so as to be movable thereon, the measuring device including: a carrier having a base in contact engagement with said surface; said carrier defining a guide path extending vertically upwardly from said base; a measuring head mounted on said carrier so as to be displaceable along said guide path; said measuring head including a measuring probe responsive to contact in a plurality of spatial directions; and, position sensing means for measuring the vertical position of said measuring head along said guide path;
    linkage means for connecting said measuring device to a fixed reference location on said planar surface;
    a plurality of sensing units mounted on said linkage means for measuring the position of said measuring device in said plane;
    said linkage means including: first and second guides; a first rotational joint for pivotally connecting said first guide at said fixed reference location; a second rotational joint for pivotally connecting said second guide to a second fixed reference location on said planar surface; a first pull-out arm slideably engaging said first guide and having an outer end; a second pull-out arm slideably engaging said second guide and having an outer end; and, a third rotational joint pivotally connecting said outer ends to said measuring device;
    two of said sensing units being linear transducers for measuring the respective pull-out lengths of said arms with respect to corresponding ones of said guides; and,
    a remaining one of said sensing units being an angle encoder corresponding to one of said rotational joints for measuring the angular position of one of said arms with respect to said measuring device.

4. A coordinate measuring apparatus comprising:
    surface means for defining a planar surface;
    a measuring device mounted on said surface so as to be movable thereon, the measuring device including: a carrier having a base in contact engagement with sad surface; said carrier defining a guide path extending vertically upwardly from said base; a measuring head mounted on said carrier so as to be displaceable along said guide path; said measuring head including a measuring probe responsive to contact in a plurality of spatial directions; and, position sensing means for measuring the vertical position of said measuring head along said guide path;
    linkage means for connecting said measuring device to a fixed reference location on said planar surface;
    a plurality of sensing units mounted on said linkage means for measuring the position of said measuring device in said plane;
    support means connected to said fixed reference location;
    a fist holder mounted on said support means;
    a second holder mounted on the upper end of said carrier of said measuring device;
    a first articulating joint for articulately connecting said first holder to said support means and a second articulating joint for articulately connecting said second holder to said measuring device; and,
    an arm held in said holders for articulately connecting said measuring device to said support means so as to permit movement of said measuring device on said planar surface relative to said support means.

5. The coordinate measuring apparatus of claim 4, said measuring device being disposed entirely beneath said arm so as to be freely rotatable through 360° on said planar surface.

6. A coordinate measuring apparatus comprising;
    surface means for defining a planar surface;

a measuring device mounted on said surface so as to be movable thereon, the measuring device including: a carrier having a base in contact engagement with said surface; said carrier defining a guide path extending vertically upwardly form said base; a measuring head mounted on said carrier so as to be displaceable along said guide path; said measuring head including a measuring probe responsive to contact in a plurality of spatial directions; and, position sensing means for measuring the vertical position of said measuring head along said guide path;

linkage means for connecting said measuring device to a fixed reference location on said planar surface;

a plurality of sensing units mounted on said linkage means for measuring the position of said measuring device in said plane;

support means connected to said fixed reference location; first and second holders;

first and second rotational joints for pivotally connecting said first and second holders to said support means, respectively;

first and second guides;

a third rotational joint for pivotally connecting said first and second guides to the upper end of said carrier of said measuring device;

a first arm held in said first holder and slideably engaging said first guide so as to permit movement of said first guide relative to said first arm;

a second arm held in said second holder and slideably engaging said second guide so as to permit movement of said second guide relative to said second arm; and, said measuring device being disposed entirely beneath said arms so as to be freely rotatable through 360° on said planar surface.

7. The coordinate measuring apparatus of claim 6, said third rotational joint defining a vertical rotational axis (A); said measuring probe including a contact ball at the outer end thereof; and, said measuring head being mounted on said carrier so as to cause said contact ball to be in the immediate vicinity of said axis (A).

8. The coordinate measuring apparatus of claim 7, said measuring head being mounted on said carrier so as to cause said axis (A) to pass through said contact ball.

9. The coordinate measuring apparatus of claim 6, comprising: counter-balancing means for balancing said arms so that the latter apply substantially no weight to said upper end of said carrier of said measuring device.

10. The coordinate measuring apparatus of claim 9, said support means comprising two mutually spaced vertical stands attached to said surface means and extend upwardly of said planar surface to define respective upper ends for receiving corresponding ones of said holders thereon; and, a rigid transverse member interconnecting said stands at said upper ends thereof, said transverse member being made of a material having a low thermal coefficient of expansion.

11. The coordinate measuring apparatus of claim 10, said third rotational joint defining a vertical rotational axis (A); and, said arms extending through said guides so as to extend outwardly beyond said axis (A).

12. A coordinate measuring apparatus comprising:

surface means for defining a planar surface;

a measuring device mounted on said surface so as to be movable thereon, the measuring device including: a carrier having a base in contact engagement with said surface; said carrier defining a guide path extending vertically upwardly from said base; a measuring head mounted on said carrier so as to be displaceable along aid guide path; said measuring head including a measuring probe responsive to contact in a plurality of spatial directions; and, position sensing means for measuring the vertical position of said measuring head along said guide path;

linkage means for connecting said measuring device to a fixed reference location on said planar surface;

a plurality of sensing units mounted on said linkage means for measuring the position of said measuring device in said plane;

a table having a top plate defining a workpiece surface for receiving a workpiece thereon to be measured by said apparatus;

a narrow foot interposed between said top plate and said planar surface and being configured so as to cause said top plate to overlap said foot to form an annular gap between said top plate and said planar surface; and, said base of said measuring device being a large-surface base plate and said carrier extending upwardly from said base plate at only one portion thereof to permit said base plate to be movable under said table and into said gap when said measuring device is moved to said table for making measurements on a workpiece mounted thereon.

13. The coordinate measuring apparatus of claim 2, said fixed reference location being said foot of said table; and, said linkage means having a first end pivotally connected to said measuring device and a second end pivotally connected to said foot.

14. A coordinate measuring apparatus comprising:

surface means for defining a planar surface;

a measuring device mounted on said surface so as to be movable thereon, the measuring device including: a carrier having a base in contact engagement with said surface; said carrier defining a guide path extending vertically upwardly from said base; a measuring head mounted on said carrier so as to be displaceable along said guide path; said measuring head including a measuring probe responsive to contact in a plurality of spatial directions; and, position sensing means for measuring the vertical position of said measuring head along said guide path;

linkage means for connecting said measuring device to a fixed reference location on said planar surface;

a plurality of sensing units mounted on said linkage means for measuring the position of said measuring device in said plane;

said measuring device including first drive means for driving said measuring head along said guide path in the vertical direction; and, said apparatus including second drive means for displacing said measuring device horizontally over said planar surface.

15. The coordinate measuring apparatus of claim 14, said measuring device having a center of gravity and said second drive means acting on said measuring device at said center of gravity.

16. The coordinate measuring apparatus of claim 15, said measuring device being movable over a measuring region on said planar surface; and, said second drive means comprising: two supports mounted on said surface means adjacent said measuring region; a first linear drive arranged between said supports and mounted thereon so as to be movable therebetween in a first direction; and, a second linear drive mounted on said first linear drive for engaging and acting on said measuring device in a second direction transverse to said first direction and for coacting with said first linear drive to move said measuring device on said planar surface within said measuring region; and, a rotatable table mounted on said planar surface within said measuring region and defining a surface for receiving a workpiece on which measurements are to be made.

17. A method for determining the coordinate values of a measuring probe with a coordinate measuring apparatus which includes: a support defining a horizontal planar surface; a measuring device mounted on said planar surface so as to be displaceable thereon and including: a carrier having a base in contact engagement with said planar surface, the carrier defining a guide path extending vertically upwardly from said base, a measuring head mounted on said carrier so as to be vertically displaceable along said guide path, said measuring head including a measuring probe with a contact element $T_k$ responsive to contact in a plurality of directions, and position sensing means for measuring the position in elevation of said measuring head along said guide path; and, linkage means for connecting said measuring device to two fixed reference points on said horizontal planar surface; the method comprising the steps of:

determining the planar position coordinates (X, Y) of the measuring device for the measuring probe by making two length measurements from said two points on said planar surface, said points having a fixed spacing (b, L) from each other;

determining the angular position $\delta_4$ of the measuring device about a vertical axis (A) with the aid of an angle encoder;

computing corrective values $(X_1, Y_1)$ for said planar position coordinates (X, Y) from a known distance (h) between said axis (A) and said contact element $T_k$ as well as the measured angular position $\delta_4$;

combining said measured planar position coordinates (X, Y) with said corrective values $(X_1, Y_1)$; and, determining the elevation coordinate value (Z) of said contact element $T_k$ by means of said positioning sensing means.

18. The method of claim 17, comprising the further steps of: determining the tilt angle $\alpha_4$ of the measuring device with respect to the vertical coordinate axis with the aid of an ancillary measuring arrangement which provides ancillary measured values; computing second correction values $(X_2, Y_2, Z_1)$ from said ancillary measured values and said elevation coordinate value (Z); and, combining said second correction values $(X_2, Y_2, Z_1)$ with the measured position coordinates (X, Y) and with the elevation coordinate value (Z).

19. The method of claim 18, wherein said tilt angle $(\alpha_4)$ is measured by means of an electronic inclination measuring device mounted on said carrier.

20. The method of claim 18, wherein the measurement of said tilt angle $\alpha_4$ is performed with said ancillary measuring arrangement comprising at least three mutually spaced sensors $(M_1, M_2, M_3)$ mounted on said base of said measuring device for measuring the distance to said planar surface.

21. The method of claim 20, comprising determining the topography of said planar surface in a separate measuring process and storing the same in a computer as a two-dimensional corrective matrix; and, determining said tilt angle $\alpha_4$ utilizing said corrective matrix and the measured values of said sensors $(M_1, M_2, M_3)$.

22. The method of claim 17, wherein said planar position coordinates (X, Y) are measured with the aid of laser interferometers.

23. A method for determining the coordinate values of a measuring probe with a coordinate measuring apparatus which includes: a support defining a horizontal planar surface; a measuring device mounted on said planar surface so as to be displaceable thereon and including: a carrier having a base in contact engagement with said planar surface, the carrier defining a guide path extending vertically upwardly from said base, a measuring head mounted on said carrier so as to be vertically displaceable along said guide path, said measuring head including a measuring probe with a contact element $T_k$ responsive to contact in a plurality of directions, and position sensing means for measuring the position in elevation of said measuring head along said guide path; and, linkage means for connecting said measuring device to a fixed reference point on said horizontal planar surface; the method comprising the steps of:

determining the planar position coordinates (X, Y) of the measuring device for the measuring probe by making one distance measurement from said reference point on said planar surface and at least one angular measurement from said reference point;

determining the angular position $\delta_4$ of the measuring device about a vertical axis (A) with the aid of an angle encoder;

computing corrective values $(X_1, Y_1)$ for said planar position coordinates (X, Y) from a known distance (h) between said axis (A) and said contact element $T_k$ as well as the measured angular position $\delta_4$;

combining said measured planar position coordinates (X, Y) with said corrective values $(X_1, Y_1)$; and, determining the elevation coordinate value (Z) of said contact element $T_k$ by means of said positioning sensing means.

24. The method of claim 23, comprising the further steps of: determining the tilt angle $\alpha_4$ of the measuring device with respect to the vertical coordinate axis with the aid of an ancillary measuring arrangement which provides ancillary measured values; computing second correction values $(X_2, Y_2, Z_1)$ from said ancillary measured values and said elevation coordinate value (Z); and, combining said second correction values $(X_2, Y_2, Z_1)$ with the measured position coordinates (X, Y) and with the elevation coordinate value (Z).

25. The method of claim 24, wherein said tilt angle $(\alpha_4)$ is measured by means of an electronic inclination measuring device mounted on said carrier.

26. The method of claim 24, wherein the measurement of said tilt angle $\alpha_4$ is performed with said ancillary measuring arrangement comprising at least three mutually spaced sensors $(M_1, M_2, M_3)$ mounted on said base of said measuring device for measuring the distance to said planar surface.

27. The method of claim 26, comprising determining the topography of said planar surface in a separate measuring process and storing the same in a computer as a two-dimensional corrective matrix; and, determining said tilt angle $\alpha_4$ utilizing said corrective matrix and the measured values of said sensors $(M_1, M_2, M_3)$.

28. The method of claim 23, wherein said planar position coordinates (X, Y) are measured with the aid of laser interferometers.

* * * * *

UNITED STATES PATENT AND TRADEMARK OFFICE
CERTIFICATE OF CORRECTION

PATENT NO. : 4,961,267

DATED : October 9, 1990

INVENTOR(S) : Klaus Herzog

It is certified that error appears in the above-identified patent and that said Letters Patent is hereby corrected as shown below:

On the title page, in column 1, reference numeral [63]: delete "450," and substitute -- PCT/EP88/00450, -- therefor.

In column 1, line 9: delete "german" and substitute -- German -- therefor.

In column 1, line 61: delete "increases" and substitute -- increase -- therefor.

In column 6, line 60: delete "16" and substitute -- 1b -- therefor.

In column 8, line 37: delete "$P_1$, and $P_2$," and substitute -- $\mathcal{I}_1$, and $\mathcal{I}_2$ -- therefor.

In column 8, line 40: delete "$P_3$" and substitute -- $\mathcal{I}_3$ -- therefor.

In column 8, line 42: delete "$P_3$" and substitute -- $\mathcal{I}_3$ -- therefor.

In column 8, line 49: delete "($P_1$, $P_2$," and substitute -- ($\mathcal{I}_1$, $\mathcal{I}_2$ -- therefor.

In column 8, line 50: delete "$P_3$)" and substitute -- $\mathcal{I}_3$) -- therefor.

In column 8, line 52: delete "$P_1$, $P_2$)" and substitute -- $\mathcal{I}_1$, $\mathcal{I}_2$) -- therefor.

UNITED STATES PATENT AND TRADEMARK OFFICE
CERTIFICATE OF CORRECTION

PATENT NO. : 4,961,267

DATED : October 9, 1990

INVENTOR(S) : Klaus Herzog

It is certified that error appears in the above-identified patent and that said Letters Patent is hereby corrected as shown below:

In column 12, line 11: insert -- shown in FIG. -- between "127" and "9c".

In column 13, line 10: delete "move" and substitute -- moved -- therefor.

In column 14, line 36: delete "sad" and substitute -- said -- therefor.

In column 14, line 52: delete "fist" and substitute -- first -- therefor.

In column 14, line 67: delete "comprising;" and substitute -- comprising: -- therefor.

In column 15, line 53: delete "tend" and substitute -- tending -- therefor.

In column 16, line 3: delete "aid" and substitute -- said -- therefor.

Signed and Sealed this

Seventeenth Day of March, 1992

Attest:

HARRY F. MANBECK, JR.

*Attesting Officer*     *Commissioner of Patents and Trademarks*